May 11, 1926.

H. H. TREFFER

INCUBATOR

Filed July 3, 1922     6 Sheets-Sheet 1

1,584,154

May 11, 1926.

H. H. TREFFER

INCUBATOR

Filed July 3, 1922 6 Sheets-Sheet 2

INVENTOR
H. H. Treffer
BY
ATTORNEYS

May 11, 1926.

H. H. TREFFER

INCUBATOR

Filed July 3, 1922    6 Sheets-Sheet 5

1,584,154

INVENTOR
H. H. Treffer
BY
ATTORNEYS

Patented May 11, 1926.

1,584,154

UNITED STATES PATENT OFFICE.

HENRY H. TREFFER, OF DAVENPORT, IOWA.

INCUBATOR.

Application filed July 3, 1922. Serial No. 572,503.

An object of my invention is to provide an incubator in which the heating pipes are kept away from the sections containing the eggs, and, in which pure, heated, vitalized, and diffused air is kept circulating through the sections containing the eggs and over the hot water heating pipes at a constant speed.

A further object of my invention is to provide a device of the type described, in which the foul air is automatically expelled from the device and pure air is automatically taken into the device, and in which the amount of air exhausted and amount of air taken in, is automatically controlled by a thermostat.

A further object of my invention is to provide a device of the type described, which comprises a plurality of sections, as many of these sections as desired, being used.

A further object of my invention is to provide a device of the type described which is constructed so as to provide no dead air space in the device.

Other objects and advantages will appear in the following specification, and the novel features of the invention will be particularly pointed out in the appended claims.

My invention is illustrated in the accompanying drawings, forming part of this application, in which—

In carrying out my invention, I provide a housing which is adapted to be built up from a number of sections, whereby the housing may be extended to any length desired. As clearly shown in Fig. 4, the housing comprises four sections in the present form of the device. Each section comprises two compartments such as A and B in the first section. The compartments are adapted to house a plurality of egg receiving trays hereinafter described. The compartments A and B are enclosed on three sides thereof by vertically extending double walls, the walls providing a dead air space therebetween, thus providing a simple and efficient means for retaining the heat within the incubator. In like manner, additional sections are secured to the first section, these sections comprising compartments C, D, E, F, G, and H. Compartments A—C, C—E, and E—G are secured to each other by bolts 1, whereby the compartments A, C, E, and G form a single unit which has a double wall space extending on all four sides thereof. In a like manner, the compartments B, D, F, and H are secured to each other and have a double wall extending therearound. The compartments A, C, E, and G and B, D, F, and H are separated from each other by what I choose to term as a gallery. One end of this gallery is provided with double doors 3 and 4 whereby the gallery is effectually insulated in the same manner as the compartments are insulated from the external air. The other end of the gallery 2 communicates with the heating chamber 5.

Figure 4:
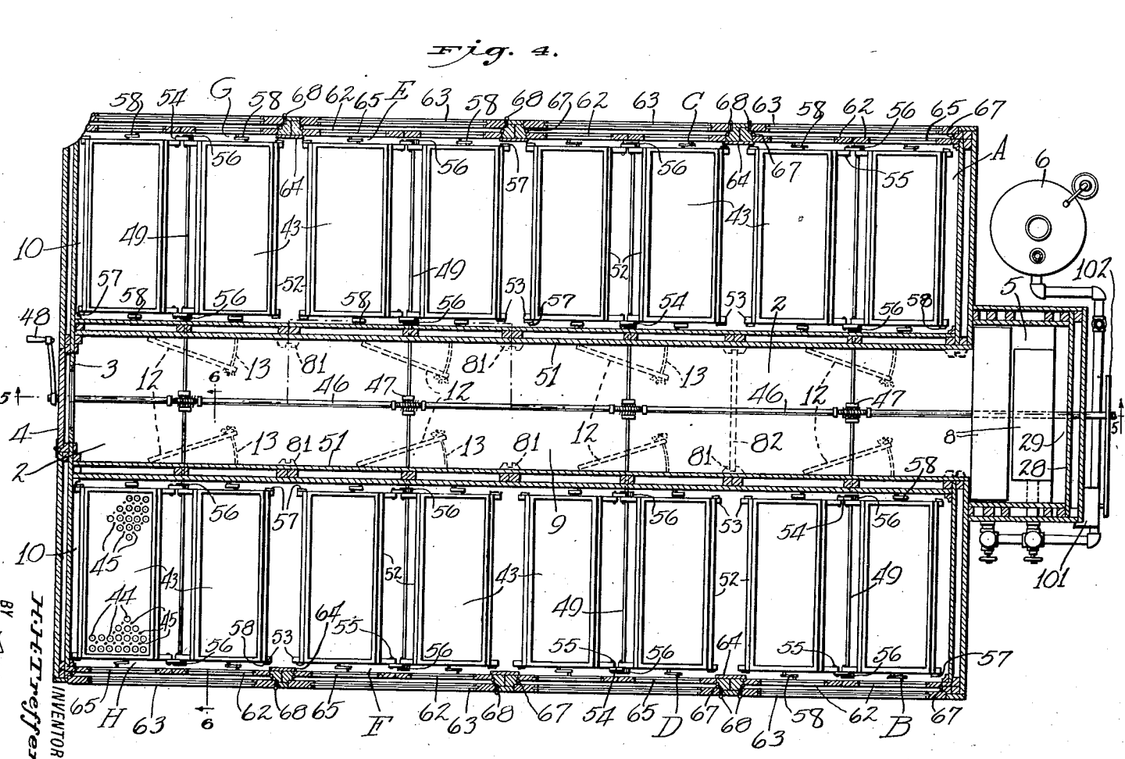
Fig. 4 is a section along the line 4—4 of Fig. 1.
Figure 5:
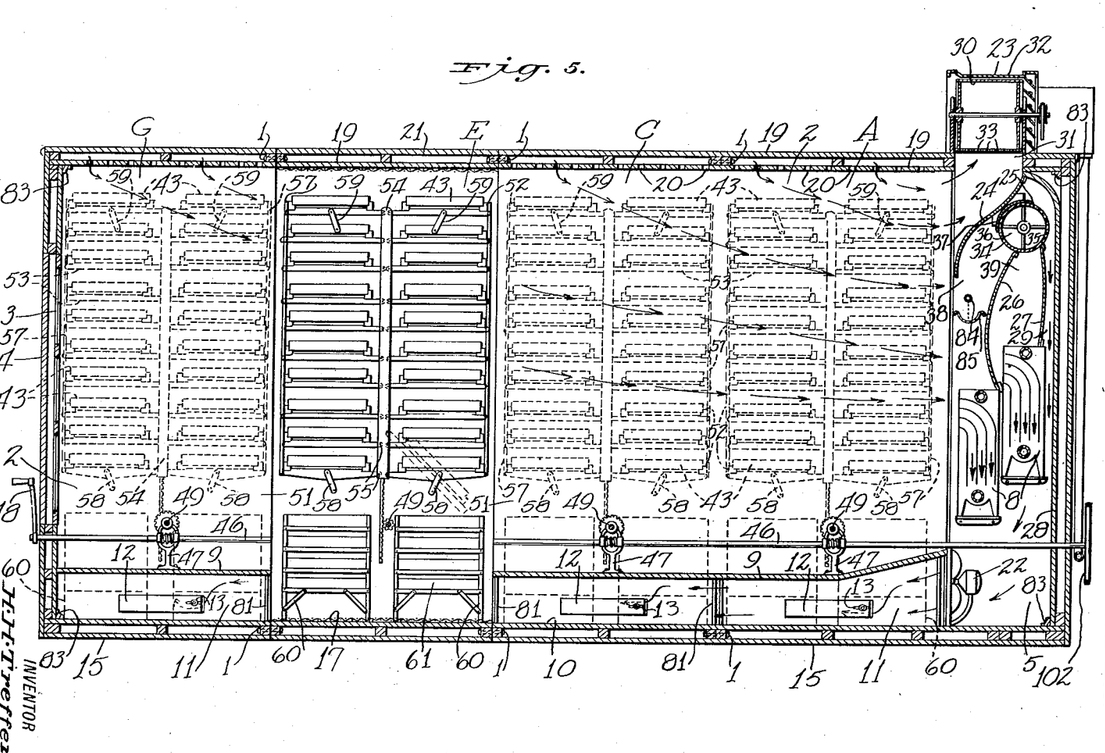
Fig. 5 is a section along the line 5—5 of Fig. 4.

The heating unit is not disposed within the heating chamber 5 but it is disposed adjacent thereto, as clearly shown in Fig. 4. The present system uses hot water as a heating means and employs a boiler 6 which is connected by piping to the hot water expansion tank 7 and to radiators 8. These radiators have air passages therein through which the air passes and is heated. It is obvious that any other form of radiator may be used. In Fig. 5, I have shown two radiators 8 as being employed, although it is obvious that as many radiators as desired may be used. The radiators have downwardly extending flues which convey the air in the direction of the arrows in Fig. 5 and heat the air as it passes therethrough.

Figure 6:
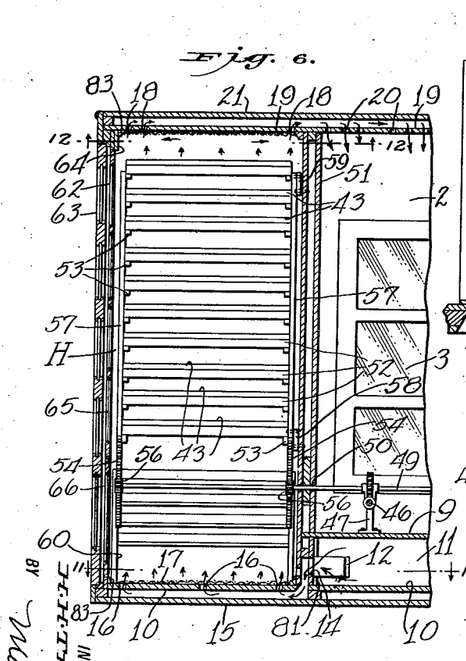
Fig. 6 is a section along the line 6—6 of Fig. 4.

A partition 9 extends along the gallery 2 and is spaced a slight distance above the floor 10 of the incubator, thereby defining an air duct 11. In Fig. 6, I have shown the cross section of the duct 11 and the means by which it is brought into communication with any of the compartments A to H, inclusive, desired. It will be seen that the compartments are in communication with the duct 11 by draft doors 12 (see also Fig. 4). Butterfly bolts 13 connected to the free ends of the doors 12 determine the extent to which the doors may be opened. The doors may be opened to any degree desired so as to admit more or less of the heated air into the compartment. The heated air in passing from the duct 11, goes through the opening 14 which may be closed by the door 12, downwardly between the floor 10 and the supporting floor 15 and then up through the openings 16 in the floor 10.

Figures 11, 12, 13, 14:
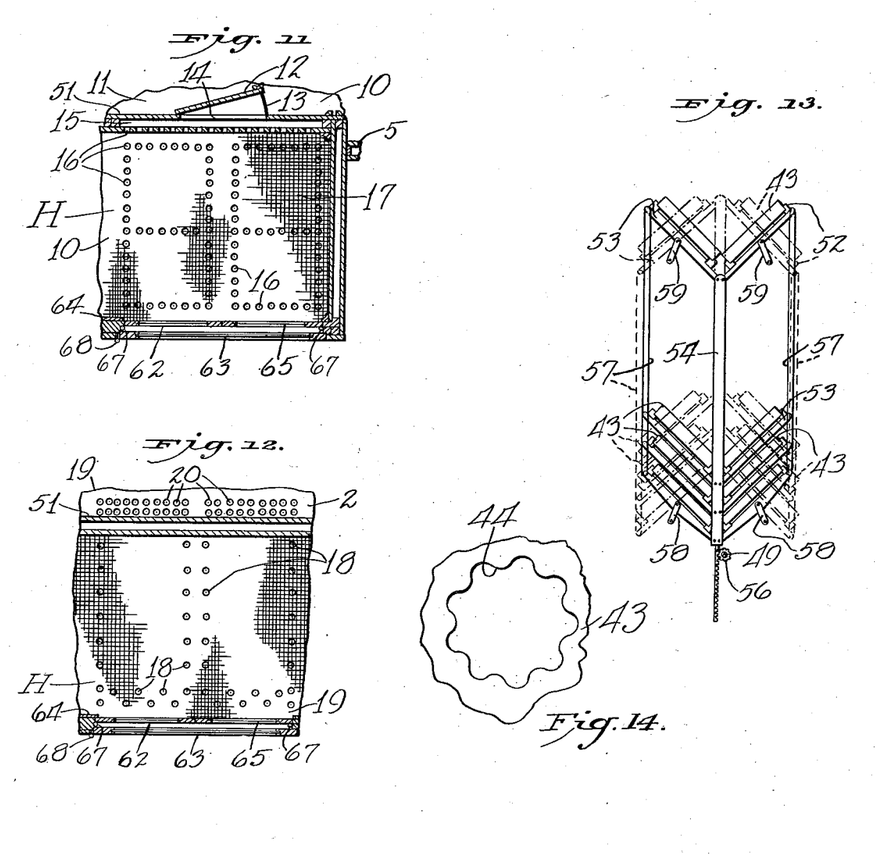
Fig. 11 is a section along the line 11—11 of Fig. 6.
Fig. 12 is a section along the line 12—12 of Fig. 6.
Fig. 13 is a diagrammatic view of a portion of the device.
Fig. 14 is an enlarged view of one of the openings in the egg trays.

The openings 16 are disposed about the floor of the compartment in the manner clearly shown in Fig. 11. It is obvious that as many openings as desired may be disposed in the floor 10 so as to permit the heated air to readily pass from the duct 11 into the compartment. A screening 17 is disposed on the floor of the compartment and is of such a mesh as to thoroughly diffuse the air as it passes therethrough. In this manner, all drafts through the compartments are entirely eliminated and a steady flow of heated air through the compartment is therefore assured. The heated air passes from the bottom of the compartment through openings 18 in the ceiling 19. It will be observed from Fig. 6 that the ceiling 19 also has openings 20 which allow the air to pass through the openings 18, the space between the ceilings 18 and 21, and pass into the gallery 2. The air then passes through the gallery 2 to the radiators 8. It will therefore be seen that a circulation of heated air is provided through the compartments A to H, inclusive, the air being thoroughly diffused as it passes through the compartments, thereby providing no drafts which would likely hinder the hatching of the eggs in the compartments. To keep the flow of air through the incubator, I provide a fan 22, which is disposed at the intake of the duct 11 and which is adapted to force the air into the duct 11 and to draw it from the radiator 8. It is obvious that the air within the incubator would become stale if used constantly, and I therefore provide a simple automatic means for expelling the old air and taking in a fresh supply. In Fig. 5 I have shown a squirrel cage balanced exhaust vent 23 in the upper end of the chamber 5, whereby a portion of the heated air will pass through the vent as the air is being drawn to the radiator. A baffle plate 24 extends downwardly into the chamber 5 a spaced distance and is adapted to deflect a portion of the air out through the vent 23. An intake squirrel cage vent 25 is also disposed in the chamber 5 and is in communication with the radiators 8 by baffle plates 26 and 27. It will be noticed that the baffle plate 27 is spaced from the vertical wall 28 of the chamber 5, thereby providing an air passage 29 which extends from the intake 25 to the duct 11. It will be observed that this passage 29 is not in communication with the radiator 8 and that therefore the air in passing through this passage will not be heated.

Figure 7:
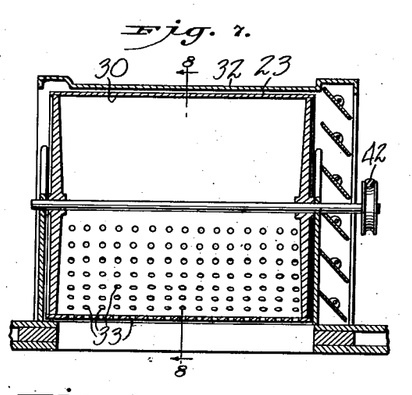
Fig. 7 is a section along the line 7—7 of Fig. 8.
Figure 8:
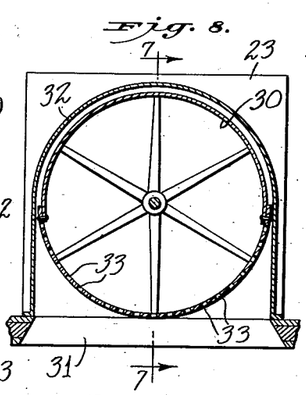
Fig. 8 is a section along the line 8—8 of Fig. 7.

Figures 7 and 8 illustrate the type of exhaust vent used with the incubator. The exhaust vent comprises a cylinder 30, which is disposed directly above the outlet opening 31. The cylinder is enclosed by a semicircular shield 32, the shield being secured in place to the sides of the opening 31. Half of the cylinder 30 is perforated as at 33. The ends of the shield 32 are open and permit the exhaust air to pass therethrough. By rotating the cylinder 30, the quantity of air expelled from the incubator may be regulated at will.

Figures 9, 10:
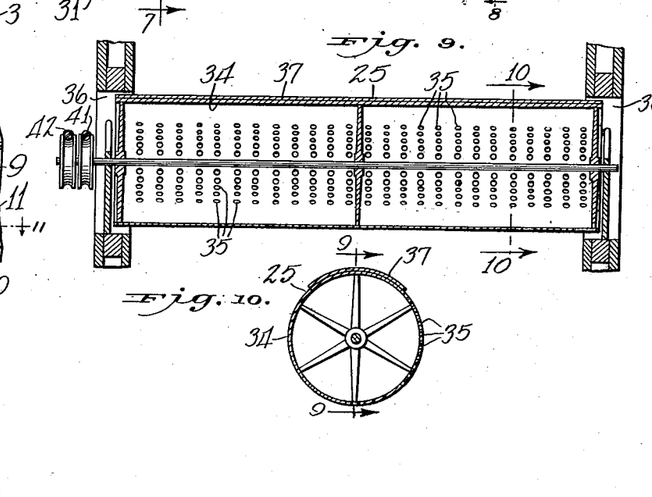
Fig. 9 is a section along the line 9—9 of Fig. 10.
Fig. 10 is a section along the line 10—10 of Fig. 9.

The intake squirrel cage is disclosed in Figures 5, 9, and 10. In this device, the cylinder 34 has a quadrant thereof perforated, as at 35, which is adapted to allow the air to pass from within the cylinder to the exterior of the cylinder by means of the openings. The cylinder 34 extends across the chamber 5 and has its ends disposed in openings 36 of the walls of the chamber (see Fig. 9). The air is drawn to the openings 36 into the cylinder 34 and out through the openings 35 by means of the fan 22. A shield 37 is adapted to cover a quarter of the cylinder (see Figs. 5 and 10) and prevents air from entering the chamber 5 when the perforated portion 35 of the cylinder is covered by the shield 37. In this manner the amount of air may be regulated at will. The baffle plates 26 and 27 extend to the cylinder 34 and are adapted to convey the air from the cylinder. When the cylinder is rotated so as to dispose the perforated portion 35 in alinement with the shield 37, no air is admitted to the chamber. The cylinder may be rotated so as to dispose the perforated portion between the shield 37 and the baffle plate 26, between the baffle plates 26 and 27, or between the baffle plate 27 and the shield 37. In this manner, the air may be directed into the air duct 38, the air duct 39, or the passage 29. A thermostat 40 is operatively connected to the cylinder 34 by a belt 41. The cylinder 34, in turn, is connected to the cylinder 30 by means of a belt 42. From this construction, it will be observed that I provide a simple means for automatically regulating the exhaust and intake of air into the incubator.

It is obvious that the thermostat 40 may be regulated to any predetermined temperature so as to effectually control the air flowing into and out of the incubator.

In addition to the double wall construction, the interior of the ceiling 19 is protected by a three-ply strip of rosin or other building paper. The ceiling 19 has a sheet of galvanized metal placed thereon and the interior wall of the chamber 5 is lined with asbestos. In this manner, the incubator is thoroughly insulated so as to retain all of the heat generated by the heating plant. As heretofore stated, the thermostat 40 keeps the temperature within the incubator constant.

The compartments A to H, inclusive, carry trays 43 which are adapted to receive eggs. In the present form of the device I have shown two tiers of trays disposed in each compartment, each tier consisting of ten trays. It should be noted that the trays are not made from metal and therefore the eggs do not contact with any metal while incubating. In the present form of the device, I have shown each tray as being constructed so as to contain one hundred and forty-four eggs. It is obvious that the number of trays and the number of openings in each tray may be varied at will. Beside the egg receiving openings 44 I dispose a plurality of small openings 45 to permit the heat to readily pass through the trays so as to contact with the eggs and thereby assure a perfect heating medium for the eggs during the entire incubating period.

In Figures 5, 6 and 13, I have illustrated the means by which the trays 43 are held in position and also the means by which they are tilted. A crank shaft 46 extends longitudinally through the gallery 2 and is supported by bearings 47. The crank shaft 46 projects beyond each end of the incubator and has crank handles 48 rigidly secured thereto. In this way the crank shaft 46 may be rotated from either end of the device. Rods 49 extend transversely to the crank shaft 46 and project into each of the compartments A to H, inclusive. This construction is clearly shown in Fig. 4 and it will be noted that the present form of the device has four rods 49. The ends of each rod are journalled in bearings 50 which are carried by the inner partitions 51 of the device. The partitions 51 divide the gallery 2 from the compartments. The trays 43 are disposed in angle irons 52, which in turn are carried by the bases 53. The bases 53 are connected at their interior ends to a vertical extending rack 54 by rivets or bolts 55. The rack 54 is operatively connected to the transverse rod 49 by means of a pinion 56. The rack 54 is disposed in each of the compartments A to H inclusive and is adapted to be moved vertically when either of the cranks 48 is actuated. It is obvious that when the racks 54 are moved, they will raise the adjacent ends of the bases 53. The outer ends of the bases 53 are connected to each other by bars 57, whereby the bases are retained in parallelism even though the bases are swung into various positions. The bases of the lowermost trays 43 are supported by links 58. In a like manner, the bases of the uppermost trays are supported by links 59. In this manner, the two sets of trays are supported and at the same time are permitted to be swung into the full or dotted line position shown in Fig. 13. During the incubating period, the eggs have to be turned in order to keep them from spoiling. Formerly, this was done by hand, which not only resulted in a loss of heat, but in spoiling many of the eggs. With the present means just described, the eggs are swung from a position at 45° from vertical to a position at 45° beyond vertical. The eggs in reality are swung through an arc of 90°. The trays in all of the compartments of the incubator are swung as heretofore disclosed, and effectually turn the eggs so as to prevent the latter from spoiling. For example, the eggs, when swung into the various positions, permit the heat to strike different portions of the eggs, and thus uniformly heat them throughout. It is obvious from Figure 13 that the eggs, when held in the trays illustrated by the full line position, will be heated on one side thereof, and when held in the trays illustrated by the dotted line position, will be heated on the opposite side. All of the trays are actuated by the cranks 48 or motor turning device.

Beneath the trays 43 are disposed racks 60, these racks carrying hatching trays 61. When using the incubator, any desired number of eggs may be disposed therein on different days, so as to provide a device which continuously hatches chickens or eggs of other fowls. The trays 43, which contain eggs that are near the end of the hatching period, are disposed in the racks 60, and trays 43 containing fresh eggs, are disposed in place of the old trays 43. When the chickens are hatched, they are placed in the bottom of one or more of the compartments which takes the place of a nursery.

Figure 1:
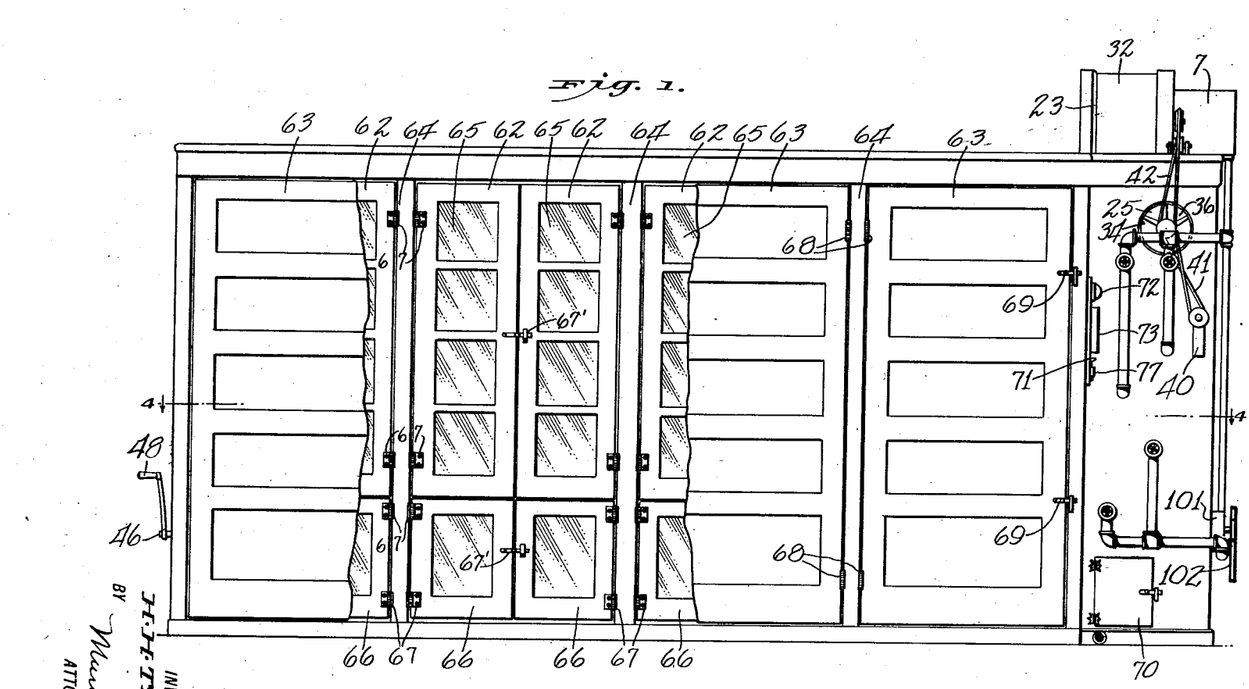
Fig. 1 is a side elevation of the device, a portion thereof being broken away.

Access to the trays 43 is provided by means of doors 62 and 63. The doors 62 are carried by the inner partition 64 of the outer wall of the incubator. The construction of the doors is clearly shown in Figures 1 and 4. In the present form of the device, I have shown two doors 62 for each compartment. These doors may be provided with glass windows 65, or with laminated panels. The doors 62 extend from the top of the incubator to the bottom of the trays 43. These doors are not provided with glass, but are provided with laminated panels. The doors 62 and 66 have spring hinges 67, whereby the doors will instantly close when released. The doors are locked in closed position by means of shutter fasteners 67'. The doors 63 to the outer partition of the outer wall may extend the entire distance of each compartment, as illustrated in Figure 1, or may be double doors. These doors are also provided with spring hinges 68 and with shutter fasteners 69. The eggs within the incubator may be inspected without the necessity of allowing any of the heated air to pass out of the incubator. When inspecting the eggs, any one of the doors 63 may be opened, and the eggs viewed through the glass portion 65. A door 70 permits access to the fan 22, this door being in the wall of the chamber 5 (see Figure 1).

Figure 2:
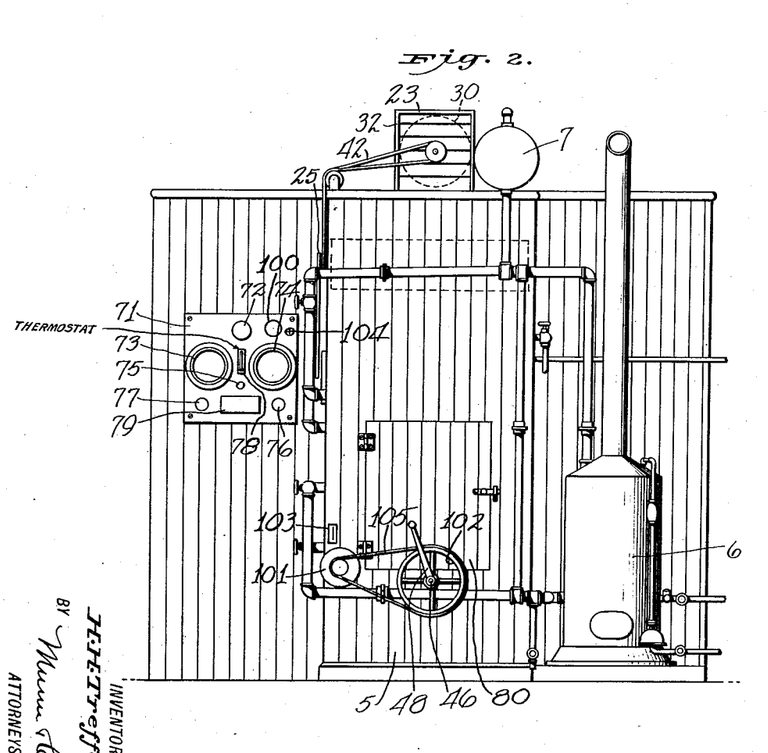
Fig. 2 is an end elevation of the device.
Figure 3:
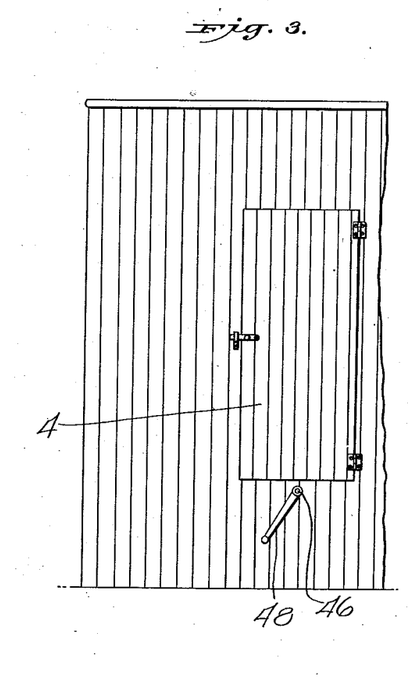
Fig. 3 is an elevation of the opposite end of the device.

The wall of the incubator disposed adjacent to the chamber 5 carries an instrument board 71. This board is supplied with instruments which tell the condition of the air within the incubator. The board carries an automatic alarm bell 72, an automatic recorder 73, a humidity recorder 74, a clock 75, a fan switch 76, a master thermometer 77, and a thermostat motor control 78. The switch 76 is connected to the fan 22 so as to actuate the fan when desired. The board 71 can also carry a frame 79 which holds the weather forecast sheets, so that the atmospheric conditions for the next twenty four hours may readily be known. A thermometer is disposed in each one of the compartments A to H inclusive, and is connected to the master thermometer, whereby the temperature within the incubator is readily noted. Entrance into the chamber 5 may be obtained through the door 80, which is disposed in the outer wall of the chamber 5 (see Figure 2).

From the foregoing description of the various parts of the device, the operation thereof may be readily understood. As heretofore stated, the device is adapted to hatch any number of chickens, from 2800 to 23,040 or more. In hatching 2800 chickens, only one of the sections is used, i. e., the section having the compartments A and B. It will be noted from Figure 4 that the duct 11 has grooves 81 therein, these grooves being disposed at the junction of the sections.

When it is desired to use only one section, a panel 82 is disposed in the grooves 81, which are positioned between the sections adjacent to the chamber 5. In other words, the partition 82 will be disposed in the position shown in Figure 4. The heated air will now pass through the duct 11 and the doors 12 which communicate with the compartmetns A and B. The air will not be permitted to pass into the compartments C and D, since the partition 81 closes the duct between the two compartments. In using the compartments A and B, only the trays in the compartments are filled with the desired number of eggs. As heretofore stated, in using the compartments A and B, the device is adapted to hatch 2800 chickens. This number can be varied at will, since the number of trays may be changed, and the number of openings in the trays may also be changed.

The heated air passes from the duct 11 through the openings 16, and is diffused by the screen 17. The air then passes upwardly through the trays, the trays permitting the air to pass thereby, since they are provided with small openings 45. The air continues to pass upwardly, and flows out through the openings 18, through the openings 20, and into the gallery 2. The fan 22 keeps the air circulating at a constant speed, so as to cause no draft or eddies of air to contact with the eggs. Part of the air, in passing toward the radiators 8, is expelled through the exhaust vent 23. The exhaust of the air and the intake of fresh air is automatically controlled by the thermostat 40 in the manner heretofore described. The thermostat 40 automatically keeps the air within the incubator at a constant temperature, and also prevents the air from becoming foul.

By disposing the partition in the required groove 81, any number of compartments may be used for hatching the eggs. The amount of air entering into the compartments is regulated by the doors 12. When it is desired to turn the eggs, it is merely necessary to actuate the crank shaft 46, whereupon the trays 43 will be simultaneously tilted into the desired position. In this manner, all of the eggs are heated on all sides. The incubator has cove corners 83 which eliminate all dead air space within the incubator. All of the air within the incubator is kept in ciculation, and is therefore maintained at a uniform heat.

One of the principal features of the device lies in the fact that the heating means is disposed exteriorly of the incubator, and that none of the heating pipes passes through the compartments containing the eggs. Furthermore, the heating means makes use of hot water, thereby eliminating the necessity of disposing gas pipes within the incubator. The device is sectional and can be built to any length desired. The thermostat 40 automatically opens or closes the exhaust vent 23, and the intake 25, so as to effectually remove all of the foul air and also avoid undue air pressure.

The air in the incubator is kept at the proper humidity by a water pipe 84 and a water trough 85. The air, in passing back to the radiators 8, comes in contact with the water in the trough 85, and takes up the proper amount of water vapor. In case the air within the incubator becomes overheated, the thermostat 40 swings the cylinder 34 so as to cause the air to travel down the passageway 29, and thereby not be heated by the radiators. The device is so constructed that it is practically automatic in operation, the only requirement being that the eggs be tilted by means of the crank handles 48, and the trays 43 be removed when the eggs therein near their hatching period. The device is thoroughly insulated by the double wall construction, and provides a relatively simple, effectual, and dependable means for hatching chickens in any numbers desired. The chickens can be hatched at intervals, such as every day, every week, or at any other stated interval. The instrument board 71 informs the operator of the condition within the incubator at a glance.

Each of the compartments has a thermometer therein which is in connection with the master thermometer 78. The screen 17 not only diffuses the heated air, but also prevents the chickens from falling through the openings 16.

It should be noted that the large openings 44 in the trays 43 are fluted as is clearly shown in Figure 14. This construction permits the opening to hold the egg and to still provide openings adjacent to the egg through which the heated air passes. In this manner the sides of the egg are kept constantly heated by the air passing thereby.

I also provide means for rocking the trays, this means being controlled by a time mechanism. As clearly shown in Figure 2, this mechanism includes a clock 100, a motor 101, a drive wheel 102, which is mounted on the shaft 46, an automatic switch 103, and a starting switch 104. The motor 101 is connected to the wheel 102 by a belt 105. The clock is electrically connected with the switch 103, which in turn, controls the motor, whereby the egg trays will be automatically swung into a different position at pre-determined intervals of time. This mechanism, however, does not interfere with the manual swinging of the trays by means of the crank handles 48.

I claim:

1. An incubator comprising a plurality of sections removably secured together, each section consisting of two egg receiving compartments spaced from each other, the space between the compartments forming a gallery when said sections are assembled, an air-duct disposed in said gallery, means for placing one or more of said compartments in communication with said duct, heating means disposed exteriorly of said sections and being in communication with said duct, passageways communicating with said gallery and said compartments, and a fan for forcing the air through said duct, whereby the air will circulate through said duct, compartments, passageways, gallery, and said heating means, and thence back to the duct.

2. An incubator comprising egg receiving compartments, an air duct communicating with said compartments, heating means disposed exteriorly of said compartments and being in communication with said air duct, a partition dividing said air duct into two passageways, said passageways, throwing said compartment in communication with said heating means, means disposed at the end of one of said passageways for forcing air through said compartments, passageways, and heating means, so as to provide a constant circulation of air, means for diffusing air as it flows from one of said passageways into said compartment, an exhaust vent and an intake vent in communication with said passageways, and thermostatically controlled means for automatically regulating the flow of air through said exhaust and intake vents.

3. An incubator comprising a plurality of sections each section consisting of two egg receiving compartments spaced from each other, a partition disposed in the space between the compartments and dividing this space into an air passageway and an air duct, said passageway being in communication with the tops of said compartments and said air duct being in communication with the bottom of said compartments, and means for forcing heated air through said duct and withdrawing it from said passageway so as to provide circulation of air through said compartments.

4. An incubator comprising a plurality of sections removably secured together, each section consisting of egg receiving compartments spaced from each other, the space between the compartments forming a means for conveying air to and from the compartments, heating means disposed exteriorly of said sections and being in communication with the space between said compartments, and means for forcing the air past said heating means, through the compartments and back to the heating means thereby providing a circuitous passage for the air.

5. An incubator comprising a plurality of compartments spaced from each other, the space between the compartments forming a passageway for conveying air to and from the compartments, means for placing one or more of said compartments in communication with the space between the compartments, heating means disposed exteriorly of said compartments and being in communication with the space between said compartments and with said compartments and means for forcing air through the space between said compartments, through the compartments and back to the heating means thereby providing a circuitous passage for the air.

6. An incubator comprising egg receiving compartments, an air duct communicating with said compartments, heating means disposed exteriorly of said compartments and being in communication with said air duct, means for conveying the air from said compartments back to the heating means, means for forcing air past said heating means, through said air duct, said compartments, and back through the means connecting said compartments with said heating means so as to provide a constant circulation of air through said compartments, an exhaust vent and an intake vent in communication with said compartments, and thermostatically controlled means for automatically regulating the flow of air through said exhaust and intake vents.

7. An incubator comprising a plurality of sections, each section consisting of egg receiving compartments spaced from each other, the space between said compartments being divided into an air passageway and an air duct, said passageway being in communication with the tops of said compartments and said air duct being in communication with the bottom of said compartments, and means for forcing heated air through said duct and withdrawing it from said passageway so as to provide a circulation of air through said compartments.

HENRY H. TREFFER.